United States Patent
Zheng et al.

(10) Patent No.: US 11,954,105 B2
(45) Date of Patent: Apr. 9, 2024

(54) METHOD AND SYSTEM FOR STORING QUERY PLANS IN A CACHE AND METHOD FOR QUERYING A DATABASE SYSTEM

(71) Applicant: ALIBABA GROUP HOLDING LIMITED, Grand Cayman (KY)

(72) Inventors: Fang Zheng, Sunnyvale, CA (US); Zhe Chen, Hangzhou (CN); Ruiping Li, Sunnyvale, CA (US); Congnan Luo, Sunnyvale, CA (US); Yu Dong, Sunnyvale, CA (US); Jie Zhang, Sunnyvale, CA (US); Li Zhang, Sunnyvale, CA (US); Ji Jiannan, Hangzhou (CN); Dongcan Cui, Hangzhou (CN); Chaoqun Zhan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 145 days.

(21) Appl. No.: 17/420,567

(22) PCT Filed: Jan. 30, 2019

(86) PCT No.: PCT/CN2019/073885
§ 371 (c)(1),
(2) Date: Jul. 2, 2021

(87) PCT Pub. No.: WO2020/154945
PCT Pub. Date: Aug. 6, 2020

(65) Prior Publication Data
US 2022/0114179 A1    Apr. 14, 2022

(51) Int. Cl.
*G06F 16/2455* (2019.01)
*G06F 16/2453* (2019.01)

(52) U.S. Cl.
CPC .. *G06F 16/24552* (2019.01); *G06F 16/24539* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 11,093,496 B1 * | 8/2021 | Bhatia | G06F 16/24552 |
| 2012/0173822 A1 | 7/2012 | Testardi et al. | |

(Continued)

FOREIGN PATENT DOCUMENTS

| | | |
|---|---|---|
| CN | 101055544 A | 10/2007 |
| CN | 104008064 A | 8/2014 |

OTHER PUBLICATIONS

European Patent Office Communication issued for Application No. 19913461.0 which encloses the extended European Search Report which includes pursuant to Rule 62 EPC, the Supplementary European Search Report (Art. 153(7) EPC) and the European search opinion, dated Aug. 12, 2022, 11 pages.

(Continued)

*Primary Examiner* — Christopher J Raab
(74) *Attorney, Agent, or Firm* — Finnegan, Henderson, Farabow, Garrett & Dunner, LLP (57) ABSTRACT

Methods and computer systems for storing a query plan in a cache are provided. The method can include: determining a use frequency of the query plan; determining a target storage layer for storing the query plan based on the determined use frequency, wherein the cache includes at least two storage layers and each of the storage layers is associated with a compression level of query plans; processing the (Continued)

query plan according to the compression level of the target storage layer; and storing the processed query plan in the target storage layer.

15 Claims, 9 Drawing Sheets

(56) References Cited

U.S. PATENT DOCUMENTS

| | | | |
|---|---|---|---|
| 2013/0246711 A1 | 9/2013 | Testardi et al. | |
| 2013/0304723 A1* | 11/2013 | Konik | G06F 16/24542 707/718 |
| 2014/0244603 A1 | 8/2014 | Arges et al. | |
| 2015/0012692 A1 | 1/2015 | Joshi et al. | |
| 2015/0142761 A1* | 5/2015 | Konik | G06F 16/24552 707/693 |
| 2015/0142762 A1* | 5/2015 | Konik | G06F 16/24553 707/693 |
| 2015/0205535 A1* | 7/2015 | Joshi | G06F 3/0667 711/103 |
| 2020/0210429 A1* | 7/2020 | Sinclair | G06F 16/24542 |
| 2021/0073232 A1* | 3/2021 | Lee | G06F 16/24542 |

OTHER PUBLICATIONS

Anonymous, "Plan Caching" iAnywhere Solutions inc., https://infocenter.sybase.com/help/index.jsp?topic+/com.sybase.help.sqlanywhere.12.0.1/dbusage/plan-caching-queryopt.html., 1 page, 2012/.

Oracle Team, "Oracle Database 12c: Information Lifecycle Management," https://www.dbi-services.com/glob/oracle-database-12c-infomation-lifecycle-management/, 4 pages, 2013.

Richardson, Ben, "Understanding SQL Server query plan cache," https://www.sqlshack.com/understanding-sql-server-query-plan-cache/, 7 pages, 2018.

PCT International Search Report and Written Opinion dated Oct. 30, 2019, issued in corresponding International Application No. PCT/CN2019/073885 (7 pgs.).

Chinese Search Report issued in corresponding Chinese Application No. 201980084933.4 dated Jul. 29, 2023 (1 page).

* cited by examiner

METHOD AND SYSTEM FOR STORING QUERY PLANS IN A CACHE AND METHOD FOR QUERYING A DATABASE SYSTEM

CROSS-REFERENCE TO RELATED PATENT APPLICATIONS

This application is a national stage filing under 35 U.S.C. § 371 of International Application No. PCT/CN2019/073885, filed on Jan. 30, 2019, the contents of which are incorporated herein by reference in its entirety.

BACKGROUND

A database generally can be accessed in response to queries from users to provide query results. For example, Structured Query Language ("SQL") is a computer language for accessing a database (e.g., an analytic database). A query plan may be generated for providing query results. For example, an SQL statement can be processed by the analytic database system ("ADS") to generate a query plan for execution. Query plans can be stored in a cache of the ADS. Therefore, when the ADS receives a subsequent SQL statement, the ADS can look up the cache for a query plan matching the SQL statement. The cost for repeatedly generating query plans thus can be avoided.

However, a cache has a limited amount of memory and may not store all available query plans. When a query plan is not stored in the cache, the query plan may need to be generated in real time, thereby increasing the latency for serving the queries. Accordingly, improvements are needed with respect to storing query plans.

SUMMARY OF THE DISCLOSURE

Embodiments of the disclosure provide a method for storing a query plan in a cache. The method includes: determining a use frequency of the query plan; determining a target storage layer for storing the query plan based on the determined use frequency, wherein the cache includes at least two storage layers and each of the storage layers is associated with a compression level of query plans; processing the query plan according to the compression level of the target storage layer; and storing the processed query plan in the target storage layer.

Embodiments of the disclosure also provide a computer system for storing a query plan. The computer system includes: a cache including at least two storage layers and each of the storage layers is associated with a compression level for query plans; a memory storing a set of instructions; and at least one processor, configured to execute the set of instructions to cause the computer system to perform: determining a use frequency of the query plan; determining a target storage layer for storing the query plan based on the determined use frequency, wherein the cache includes at least two storage layers and each of the storage layers is associated with a compression level of query plans; processing the query plan according to the compression level of the target storage layer; and storing the processed query plan in the target storage layer.

Embodiments of the disclosure further provide a method of querying a database system. The method includes: receiving a user query; retrieving a query plan corresponding to the user query from a cache; and transmitting the retrieved query plan for execution by the database system, wherein the cache includes at least two storage layers for storing query plans and each of the storage layers is associated with a compression level of query plans.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

The techniques described in this disclosure have one or more of the following technical effects. In some implementations, the techniques described in this disclosure can organize the query plan cache as multiple layers where query plans in different layers are compressed to different degrees. This allows frequently accessed query plans to be placed at a less compressed layers to provide faster access, and infrequently accessed query plans to be placed at a more compressed layers to consume less memory space. Thus, the techniques can strike a balance between access speed and storage space of query plans. In some implementations, the techniques can also change a compression rate of the query plans in an incremental manner. For example, a portion of operators of a query plans can be compressed/decompressed instead of all operators of the query plans. Thus, the techniques can gradually change a compression level of a query plan in an incremental manner, and thus improve the efficiency of compressing/decompressing the query plan.

Figure 1A:
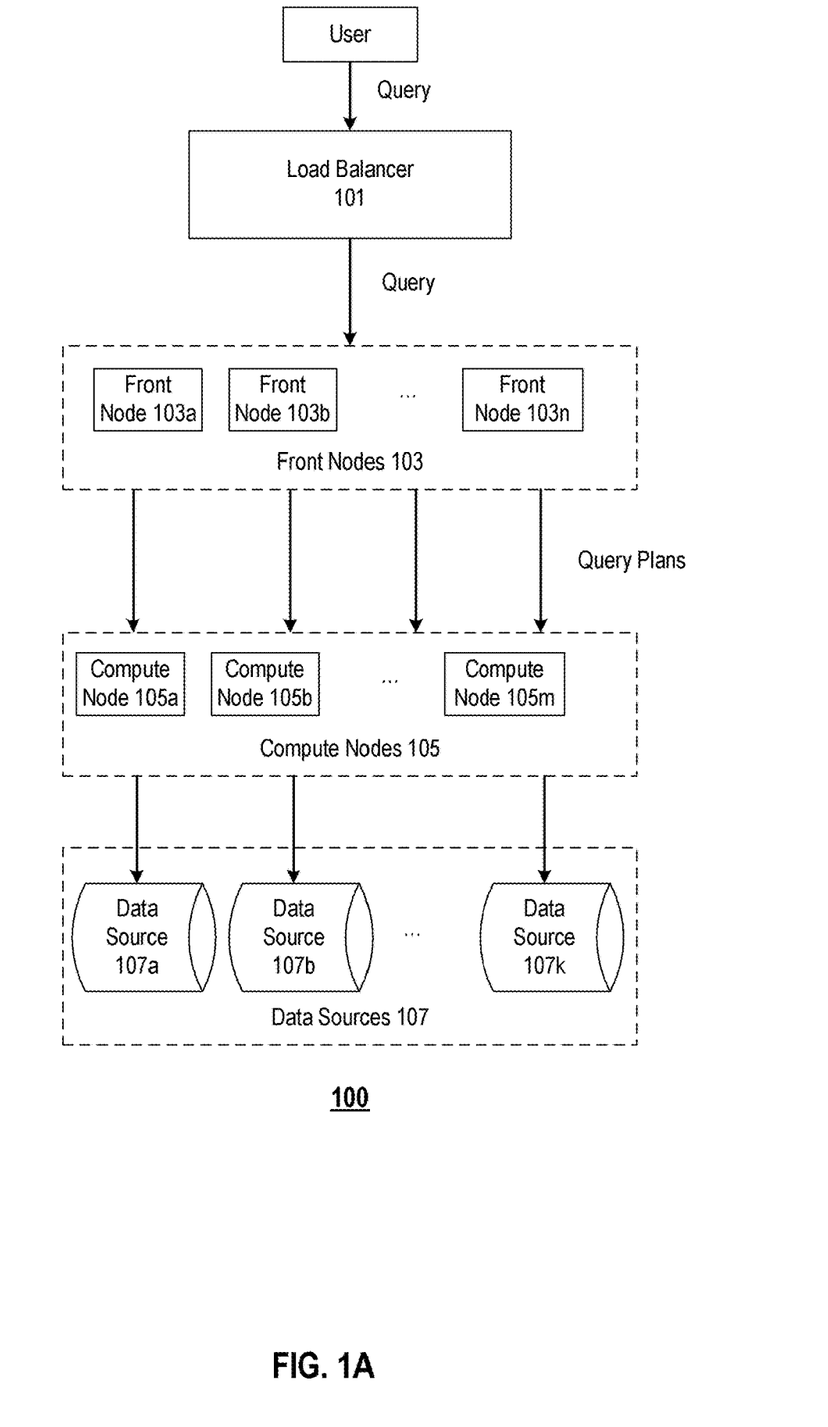
FIG. 1A illustrates an exemplary schematic diagram of an analytic database system in which various implementations described herein are practiced.

FIG. 1A illustrates a schematic diagram of an analytic database system ("ADS") 100. ADS 100 can include a load balancer 101, front nodes 103, computer nodes 105, and data sources 107. Load balancer 101 can receive a query (e.g., an SQL statement) from a user. As ADS 100 generally can include a plurality of front nodes 103, load balancer 101 can determine the current load of each front node and select one of front nodes 103 to process the received query, so that the load of each front node can be balanced. Front nodes 103 can process the received query to generate at least one query plan. For example, front nodes 103 can parse the query according to query syntax, and generate at least one query plan. Computer nodes 105 can receive the query plan, execute the query plan, gather execution results from data resources 107, and return the execution results back to the user.

When the query is complicated, the generation of the query plan can take more time than the execution of the query plan. Other than the time cost, the generation of the query plan also consumes hardware resources, such as processing units and memory. To reduce the cost of both time and hardware, each of front nodes 103 can store generated query plans in a cache. The cache can be referred to as a query plan cache.

Figure 1B:
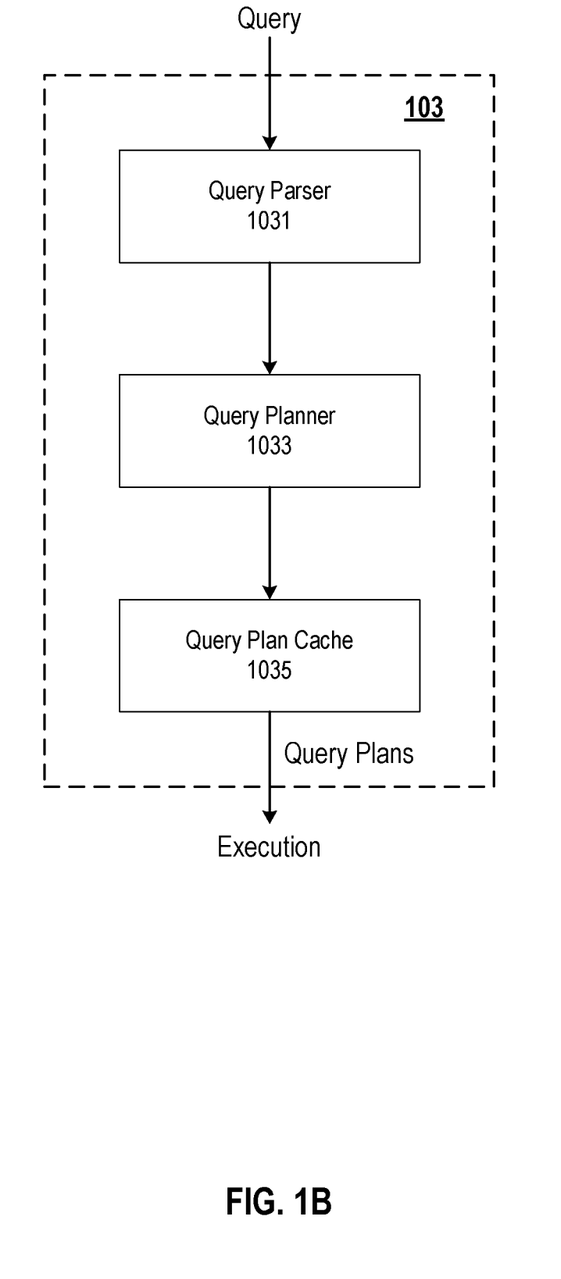
FIG. 1B illustrates an exemplary schematic diagram of a front node for implementing embodiments consistent with the present disclosure.

FIG. 1B illustrates a schematic diagram of a front node 103. As shown in FIG. 1B, front node 103 can include a query parser 1031, a query planner 1033, and a query plan cache 1035. Query parser 1031 can parse the query, and query planner 1033 can generate parameters based on the parsed query to look up query plan cache 1035 for a matched query plan. If no matched query plan is found, query planner 1033 can further generate a new query plan based on the query. As many query plans can be repeatedly used by queries, the cost for generating the query plan can be reduced. The query plan is often stored in a complicated data structure, and can occupy a large amount of space in query plan cache 1035, particular when a lot of query plans are stored to increase a matching rate of the query. To reduce the occupied space of the query plans, front nodes 103 can compress the query plans. To retrieve the query plans, decompression is required when compressed query plans are stored in the query plan cache. It is appreciated that decompressing the query plans can also take time.

In view of the above problems, embodiments of the disclosure provide systems and methods for storing query plans, so that both space efficiency and time efficiency for storing and executing query plans can be achieved.

Figure 2A:
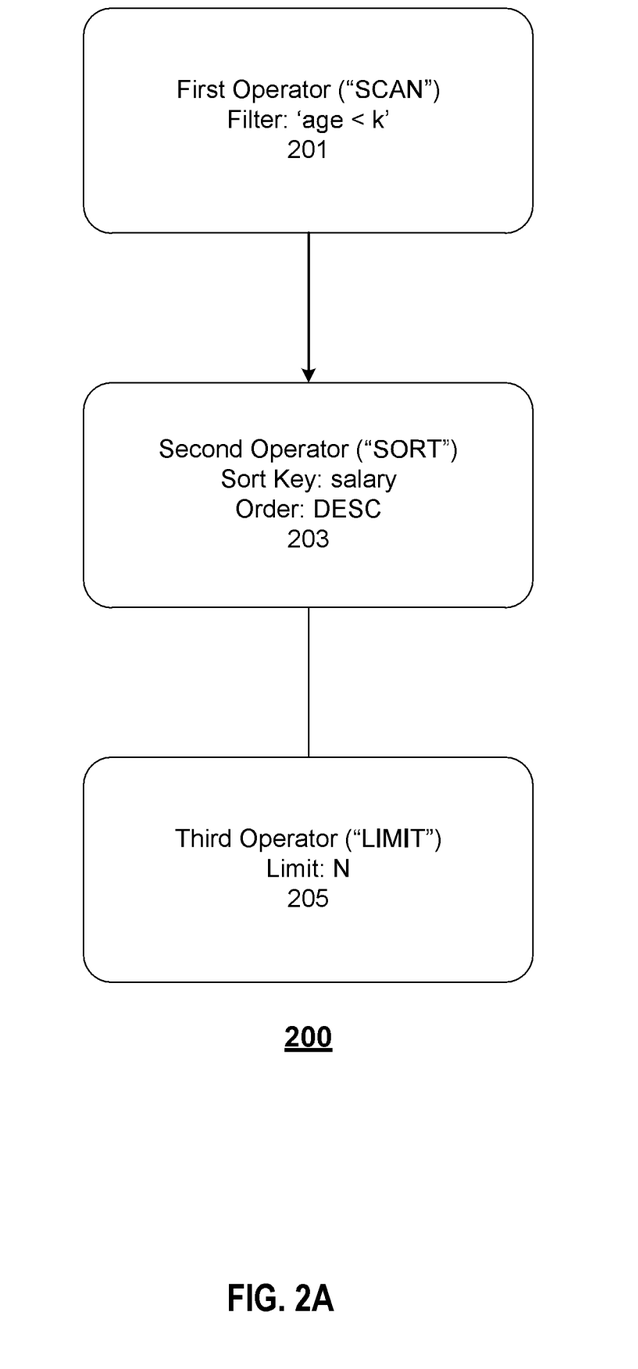
FIG. 2A illustrates an exemplary query plan 200, according to embodiments of the disclosure.

FIG. 2A illustrates an exemplary query plan 200, according to embodiments of the disclosure. As discussed above, a query plan can be generated based on a query (e.g., an SQL statement). For example, an analytic database system may include a data sheet having information of all employees of a school. The information can include employee numbers, names, ages, and salary. A user can enter an exemplary query (e.g., an SQL statement) into the analytic database system as below SELECT *
FROM employee
WHERE age <40
ORDER BY salary DESC
LIMIT 10

The above query can search for 10 employees having the highest salary under 40 year-old and display related information (e.g., employee numbers, names, ages, and salary) according a descendent order of the salary.

The analytic database system can generate a query plan 200 corresponding to the query. As shown in FIG. 2A, query plan 200 may include a first operator 201, a second operator 203, and a third operator 205. First operator 201 can be a "SCAN" operator including a filter of "age <K," wherein "K" is 40 in this example. Second operator 203 can be a "SORT" operator including a sort key of "salary" and an order of "DESE," so that results of the SQL statement can be sorted in a descendent order of the salary. Third operator 205 can be a "LIMIT" operator including a limit of "N," wherein "N" is 10 in this example. Therefore, only 10 of the results generated by second operator 203 can be finally output. "K" and "N" of query plan 200 can be assigned with any value according to the corresponding query. For example, according to the above exemplary query, "K" is 40 and "N" is 10.

Other than query plan 200, a key can also be generated by parameterizing the query. For example, a key of "SELECT * FROM employee WHERE age <K ORDER BY salary DESC LIMIT N" can be generated from the above exemplary query. Therefore, a key and a query plan can be generated based on a query.

While query plan 200 can be generated according to the above exemplary query, query plan 200 is accessible by queries other than the above exemplary query. For example, another query searching for 20 employees having the highest salary under 30 year-old and display related information according a descendent order of the salary can also access query plan 200, except values of "k" and "N" may be assigned with different values. Therefore, a query plan can be associated with one or more queries.

It is appreciated that a type of an operator is not limited to "SCAN," "SORT," or "LIMIT," as discussed above. Also, the above three operators of a query plan are merely exemplary. The query plan can include at least one operator, and the number of operators is not limited to three. For example, for a complicated query, the query plan may include 20 operators. Thus, storing complicated queries can occupy a large amount of space of a query plan cache.

Figure 2B:
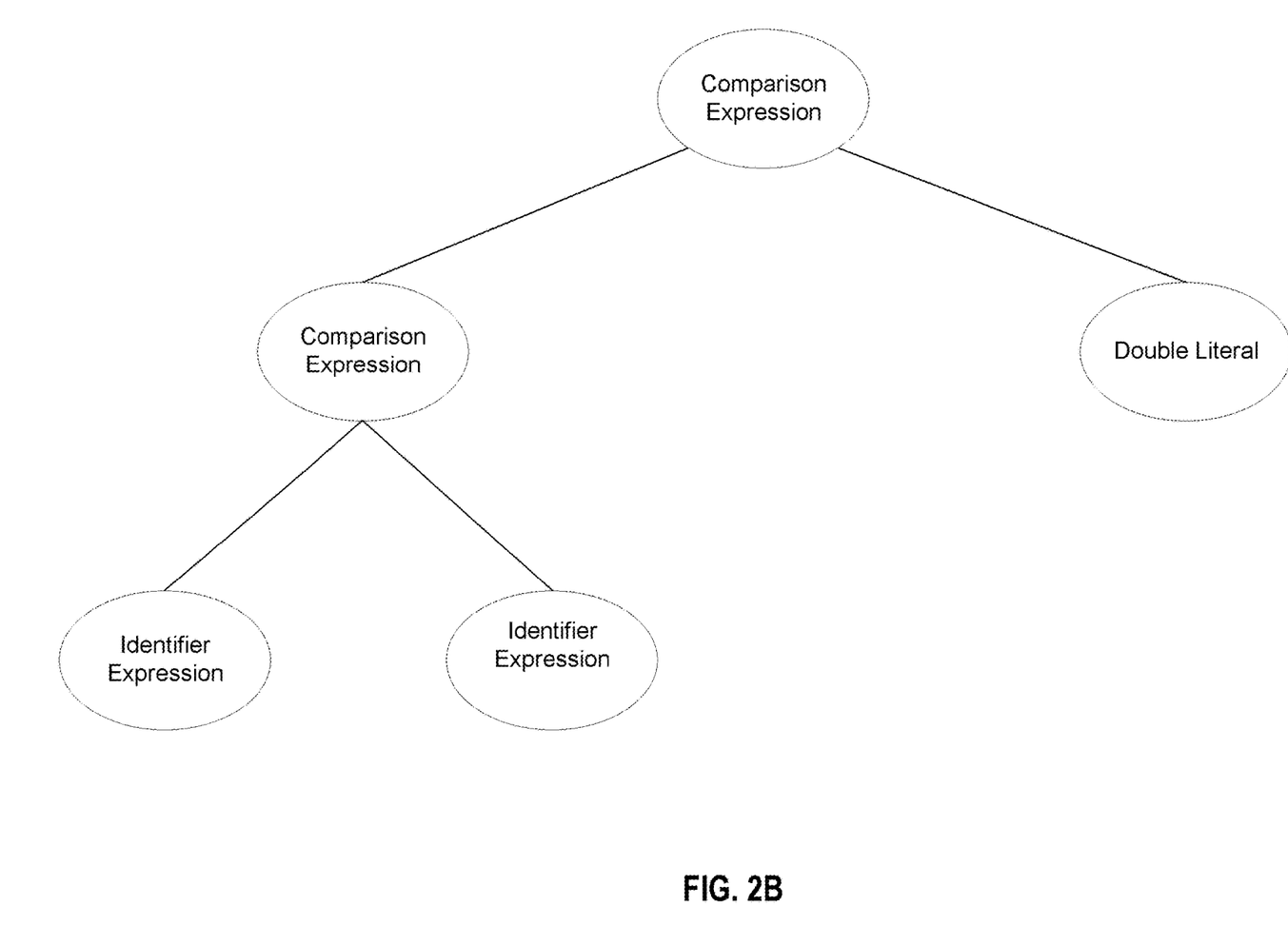
FIG. 2B illustrates an exemplary expression of a SQL statement, according to embodiments of the disclosure.

An operator of a query plan can generally include one or more query expression related to the query statement. For example, a "Filter" operator can include an expression as its filter condition (e.g., "Predicate"). In a native object format of the query plan, expressions can be stored as nodes or sub-trees in an Abstract Syntax Tree (AST) generated by parsing the query statement (e.g., the SQL statement). Those expressions can be compressed by transforming them back to the sub-strings in the query statement, and decompressed by parsing the sub-strings into AST nodes. FIG. 2B illustrates an exemplary expression of a SQL statement. For example, the SQL statement can be "column1+column2>1.0" corresponding to a sub-tree in AST of FIG. 2B.

Figure 3:
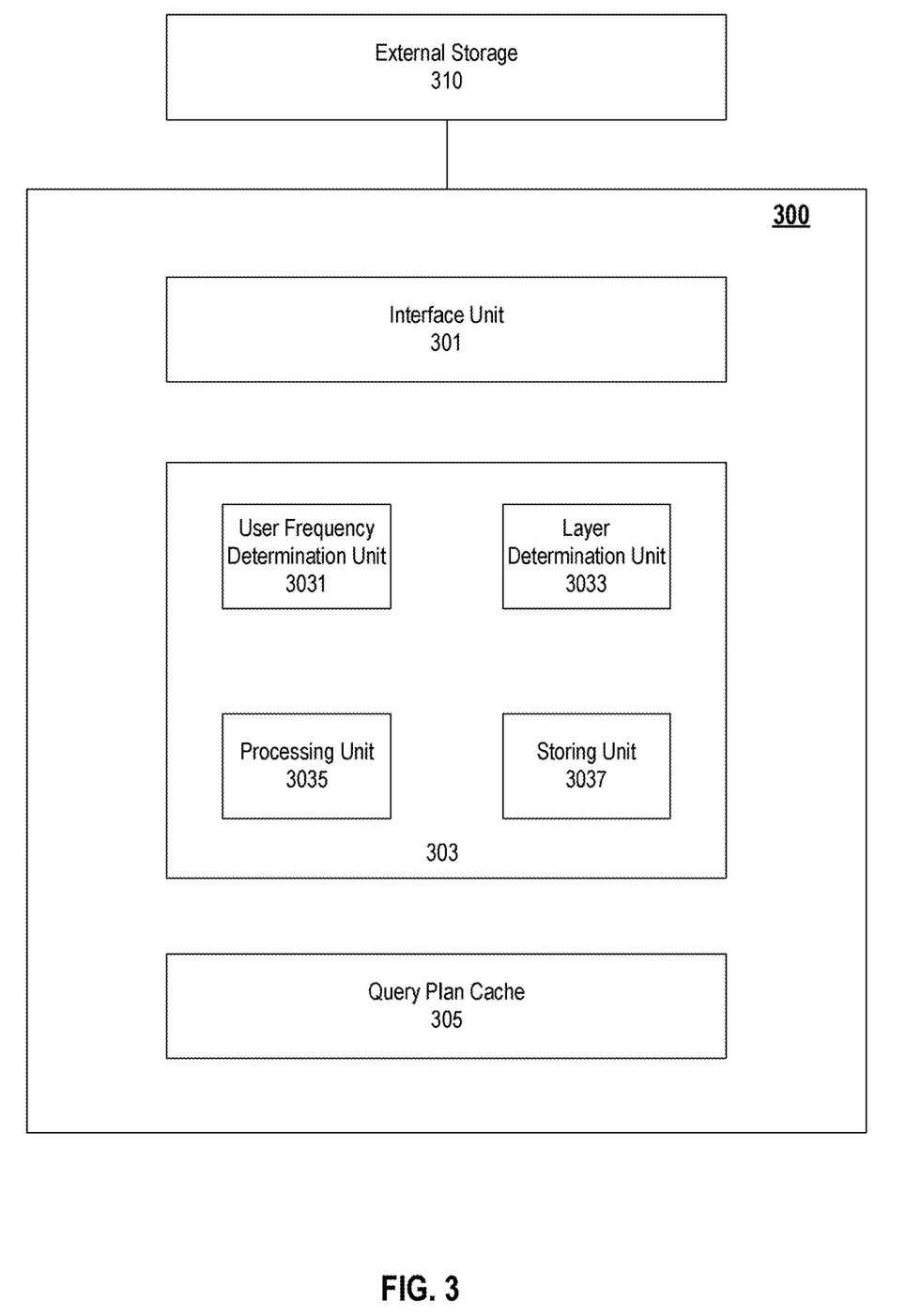
FIG. 3 illustrates an exemplary front node for storing a query plan, according to embodiments of the disclosure.

FIG. 3 illustrates an exemplary front node 300 for storing a query plan, according to embodiments of the disclosure. Front node 300 can be implemented as one of a plurality of front nodes 103 included in the analytic database system 100 shown in FIG. 1. Front node 300 may include an interface unit 301, a processor 303, and a query plan cache 305.

In some embodiments, interface unit 301 can communicate with other components of an analytic database system. For example, interface unit 301 can receive a query from a load balancer of the analytic database system, which assigns the query to front node 300 according to loads of the plurality of front nodes. Interface unit 301 can also communicate with an external storage 310 of the analytic database system. External storage 310 of the analytic database system can be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. It is appreciated that external storage 310 can be shared by other components (e.g., computer nodes or data sources) of the analytic database system.

The received query can be parsed to determine if a stored query plan matches the query. For example, the query can be parsed to identify parameter values in the query, and then transformed into a form in which the parameter values are replaced with placeholders. Based on the transformed form of the query, a stored query plan (e.g., query plan 200) corresponding to the query can be identified and sent out for execution. If there is no stored query plan corresponding to the query, the query plan corresponding to the query can be further generated. It is appreciated that the query plans can be stored in query plan cache 305 or external storage 310.

In some embodiments, query plan cache 305 can include at least two storage layers for storing query plans with different use frequencies. And each of the storage layers can be associated with a compression level for query plans. The compression level can at least include an uncompressed level, a medium compression level, a high compression level, or a full compression level. The compression level of query plans can be related to a compression algorithm. For example, a Lempel-Ziv-Oberhumer (LZO) compression algorithm can provide a medium level compression, and a BZ2 compression algorithm can provide a high level compression. In some embodiments, the compression level can be measured by percentage. For example, the medium compression level of a query plan can be 20% compression, indicating 20% of the query plan's operators are compressed. As discussed above, a complicated query plan can include, for example, 100 operators, and 20% compression can indicate 20 of the 100 operators are compressed. In some embodiments, each of the operators of a query plan can have a weight, and the percentage of compression can be further associated with the weight of the compressed operator(s). The weight of an operator can be related to a size of the operator. Generally, a complex operator can have a larger size and therefore a greater weight than a simple operator. With reference back to FIG. 2A, for example, operator 201 can have a weight of 30, operator 203 can have a weight of 50, and operator 205 can have a weight of 20. In this case, a 20% compression of query plan 200 can be provided by compressing operator 205.

Query plan cache 305 can be implemented as any type of volatile or non-volatile memory devices, or a combination thereof, such as a static random access memory (SRAM), an electrically erasable programmable read-only memory (EEPROM), an erasable programmable read-only memory (EPROM). It is appreciated that query plan cache 305 provides faster accesses to stored query plans than external storage 310.

Figure 4:
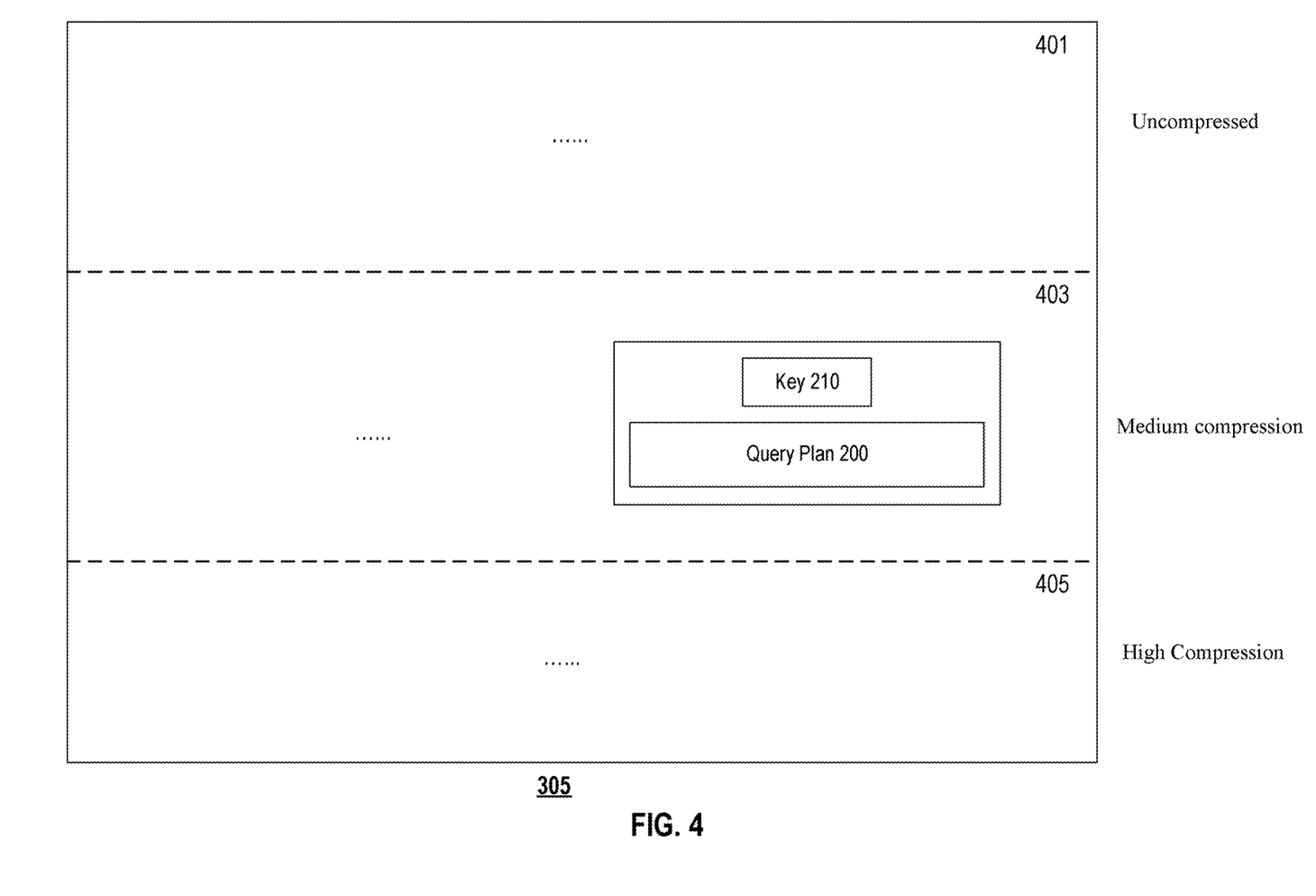
FIG. 4 illustrates an exemplary query plan cache for storing query plans, according to embodiments of the disclosure.

FIG. 4 illustrates an exemplary query plan cache 305 for storing query plans, according to embodiments of the disclosure. As discussed above, a key and a query plan can be generated based on a query. FIG. 4 further illustrates that the key can be stored in association with the query plan. The key associated with the query plan can also be referred to a reference key. In some embodiments, a query plan cache can include at least two storage layers, and each of the storage layers can be associated with a compression level for query plans. The compression levels of the storage layers can include an uncompressed level, a medium compression level, or a high compression level. More compression levels can be further provided in accordance to specific design requirements. For example, a full compressed level can also be provided. It is appreciated that a storage layer with a less compressed level can provide faster accesses of query plans. In some embodiments, a query plan with the full compressed level can be stored in the external storage, as the query plan with the full compressed level may not be used frequently.

As shown in FIG. 4, query plan cache 305 can include three layers 401, 403, and 405 corresponding to the uncompressed level, the medium compression level, and the high compression level, respectively. It is appreciated that the compression level (including the uncompressed level) can be related to a compression algorithm and/or a percentage of operators of the query plan being compressed, as discussed above.

A capacity of query plans may be allocated to each layer of query plan cache 305. For example, the capacity of each layer can be defined by the configuration of front node 103. Therefore, each compression level is related to a given capacity of query plans. In some embodiments, the capacity of each layer can be modified. For example, the capacity of a layer can be modified by a user of front node 103, so that a storage structure of query plan cache 305 can be adjusted. In another example, the capacity of a layer can be modified according to a free space of query plan cache 305. When the free space of query plan cache 305 is less than a preset value, a capacity of a layer with a high compression level can be expanded so that more query plans can be stored in query plan cache 305.

With reference back to FIG. 3, processor 303 can include multiple units, such as a use frequency determination unit 3031, a layer determination unit 3033, a processing unit 3035, and a storing unit 3037. These units (and any corresponding sub-modules or sub-units) can be functional hardware units (e.g., portions of an integrated circuit) of processor 303 designed for use with other components or a part of a program (stored on a computer-readable medium) that, when executed by processor 303, performs one or more functions.

Use frequency determination unit 3031 can determine a use frequency of a query plan. Each query plan can be associated with a counter of the use frequency, e.g., counting how many times the query plan has been accessed by a query. And the use frequency can be determined based on the counter. In some embodiments, the counter can be reset periodically. Therefore, the use frequency of a query plan can reflect how frequently the query plan has been accessed during a period of time. In some embodiments, the counter may be reset manually. Therefore, the use frequency can also reflect a total number of accessing before the counter is reset. It is appreciated that, a counter may be associated with a query plan stored outside of query plan cache 305 (e.g., stored in the external storage), counting the user frequency of the query plan.

For example, query plan 200 is initially stored in layer 403. Due to the use frequency satisfying a compression level of layer 405 (e.g., unfrequently accessed or change of the storage structure of query plan cache 305), query plan 200 may be moved to be stored in layer 405. Use frequency determination unit 3031 can access the counter of query plan 200, and determine the use frequency of query plan 200.

Layer determination unit 3033 can determine a target storage layer for the query plan based on the use frequency. As the use frequency of the query plan is associated with a compression level of a storage layer, a mapping relationship between a use frequency and a storage layer can be established by layer determination unit 3033. Therefore, layer determination unit 3033 can first determine compression levels of the at least two storage layers. For example, layer determination unit 3033 can determine that layer 401 has an uncompressed level, layer 403 has a medium compression level, and layer 405 has a high compression level. Layer determination unit 3033 can then determine a storage layer having a compression level corresponding to the use frequency as the target storage layer, e.g., based on the mapping relationship. For example, layer determination unit 3033 can determine that layer 405 having the high compression level as the target storage layer for query plan 200.

It is appreciated that, as the capacity of a storage layer is adjustable, the mapping relationship between a use frequency and the storage layer is changeable. Thus, if the capacity of a storage is adjusted, layer determination unit 3033 can update the mapping relationship between the use frequency and the storage layer.

In some embodiments, layer determination unit 3033 can further determine if the target storage layer has capacity for the query plan. If it is determined that the target storage layer contains no further capacity for the query plan, one or more existing query plans of the target storage layer can be removed from the target storage layer. For example, the one or more existing query plans can be further compressed and moved to a layer having a higher compression level. In some embodiments, if the target storage layer is a highest compression level of query plan cache 305, the one or more existing query plans may be moved to external storage 310. The one or more existing query plans can be selected according to an eviction policy. The eviction policy can at least include CLOCK, Least Recently Used (LRU), Not Frequently used (NFU), Aging, Random, and the like.

The determined target storage layer also can be external storage 310. For example, when a query plan is hardly accessed, layer determination unit 3033 may determine external storage 310 as the target layer for the query plan, so as to free storage space of query plan cache 305.

Processing unit 3035 can process the query plan according to the compression level of the target storage layer. In some embodiments, when query plan 200 is stored in a first layer and the target storage layer is a second layer, processing unit 3035 can determine a compression level difference between the compression levels of the first and second layers, determine a compression change to at least one operator of query plan 200 based on the compression level difference, and perform the compression change to the at least one operator of query plan 200.

Figure 5:
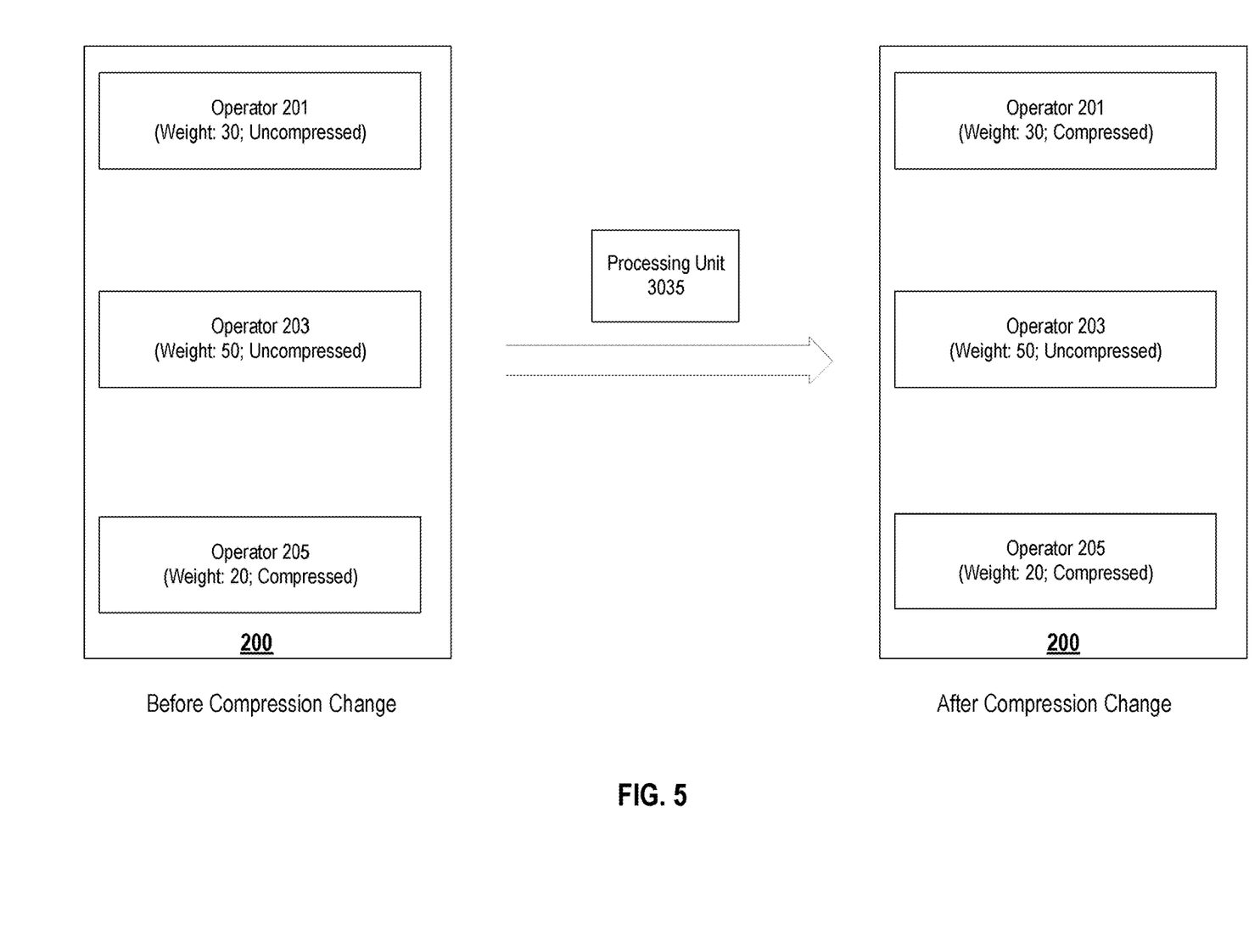
FIG. 5 illustrates an exemplary compression change to a query plan, according to embodiments of the disclosure.

For example, the medium compression level of layer 403 requires 20% compression, the high compression level of layer 405 requires 50% compression, and therefore the compression level difference can be 30%. The compression change can accordingly include compression of 30% of the query operators of query plan 200. The 30% of the query operators can be selected according to a certain selection policy. For example, the 30% of the query operators can be first 30% of query operators that appears in a query plan, the largest 30% query operators in a query plan, or the like. It is appreciated that the query operators can be weighted, and the selection of the query operators can also be based on weights of the query operators. FIG. 5 illustrates an exemplary compression change to a query plan, according to embodiments of the disclosure. In this example, the compression change is compressing query plan 200 from "medium compression level" to "high compression level." As shown in FIG. 5, operator 201 weighted 30 can be further compressed. In some embodiments, the compression change can also include decompressing an operator, if the query plan is determined to be stored in a layer that is less compressed or uncompressed.

In some embodiments, the compression change can include compression or decompression of query expressions of the portion of the at least one operator. The uncompressed query expression can be stored as an Abstract Syntax Tree Node. The compression or decompression of query expressions is similar as query operators, and the description thereof is omitted.

In some embodiments, query plan 200 can be a new query plan to the cache and is determined to be stored in a storage layer (e.g., layer 405) of query plan cache 305. As discussed above, query plans can also be stored in external storage 310. The new query plan to the cache also include query plans initially stored in external storage 310 as well as a query plan generated based on a query statement. The query plans can be stored in external storage 310 with different compression levels (e.g., an uncompressed level, a medium compression level, or a high compression level).

Further, it is appreciated that, the compression change can be directed to more than one operator, and the compression change to one operator can be different from the compression change to another operator. For example, in an exemplary compression change, operator 205 can be uncompressed while operator 203 is compressed.

Storing unit 3037 can store the processed query plan in the target storage layer determined by layer determination unit 3033. For example, storing unit 3037 can store processed query plan 200 to layer 405.

According to embodiments of the disclosure, a cache of front node 300 can provide at least two storage layers with different compression levels, so that a storage size and an access speed of a query plan can be balanced. Also, operators of a query plan can be compressed or decompressed to change a compression level of the query plan, so that the compression level of the query plan can be adjusted.

Figure 6:
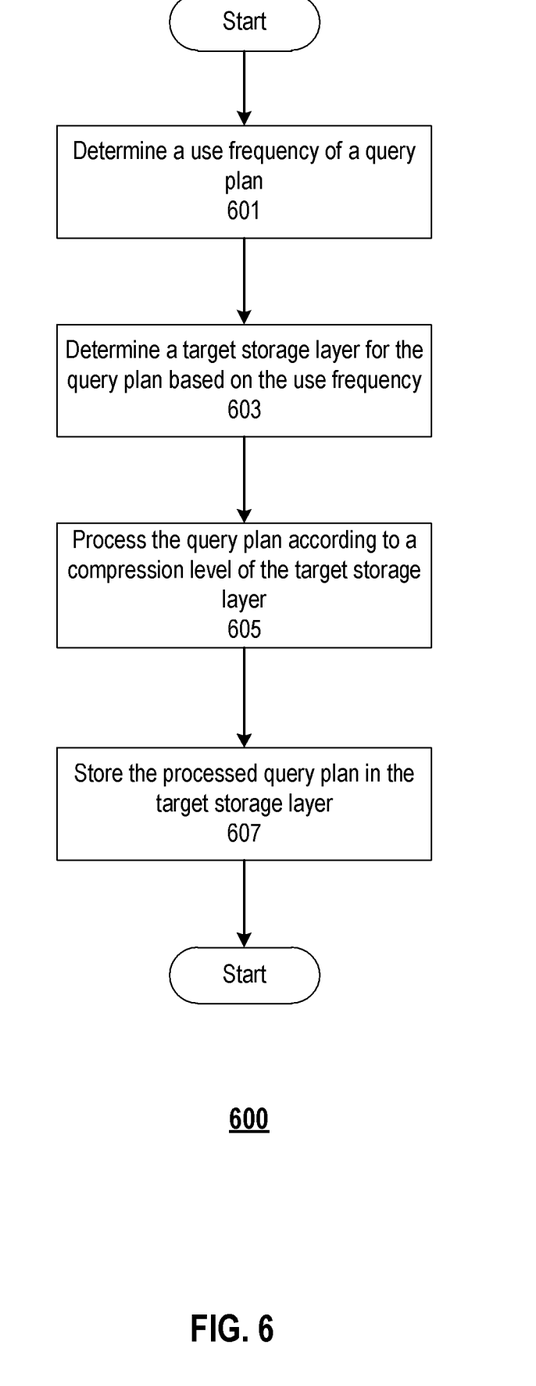
FIG. 6 is a flowchart of an exemplary computer-implemented method for storing a query plan in a cache, according to embodiments of the disclosure.

FIG. 6 is a flowchart of an exemplary computer-implemented method 600 for storing a query plan in a cache, according to embodiments of the disclosure. For example, method 600 may be implemented by a computer system, such as a front node (e.g., front node 103a of FIG. 1A) of an analytic database system. The computer system may include a memory storing a set of instructions and at least one processor configured to execute the set of instructions to cause the computer system to perform method 600. Referring to FIG. 6, method 600 may include steps 601-607 as described below.

In step 601, the computer system can determine a use frequency of a query plan (e.g., query plan 200 of FIG. 2). Each query plan can be associated with a counter of use frequency to count how many times the query plan has been accessed for generating query results, and the use frequency can be determined based on the counter.

In some embodiments, the cache (e.g., query plan cache 305 of FIG. 3) can include at least two storage layers (e.g., layers 401, 403, and 405 of FIG. 4), and each of the storage layers can be associated with a compression level for query plans. The compression levels of the storage layers can at least include an uncompressed level, a medium compression level, or a high compression level.

Each storage layer of the cache can be associated with a range of use frequencies. The range can, for example, include an upper use frequency threshold and a lower use frequency threshold. In some embodiments, the range of use frequencies can be modified, so as to expand or reduce query plans within the layer.

In step 603, the computer system can determine a target storage layer for the query plan based on the use frequency. In some embodiments, the computer system can determine compression levels of the at least two storage layers, and determine a storage layer having a compression level corresponding to the use frequency as the target storage layer.

Other than storage layers of the cache, the determined target storage layer can also be an external storage (e.g., external storage 310 of FIG. 3). For example, when a query plan is hardly accessed, the computer system may determine the external storage as the target layer for the query plan, so as to free storage space of the query plan cache.

In step 605, the computer system can process the query plan according to the compression level of the target storage layer. In some embodiments, the query plan is previously stored in a first storage layer different from the target storage layer. As discussed above, the query plan can include at least one query operator. The computer system can determine a compression level difference between the compression levels of the first layer and target storage layer, determine a compression change to at least one operator of the query plan based on the compression level difference, and perform the compression change to the at least one operator of the query plan. The at least one operator can be weighted. In some embodiments, the compression change can include compression or decompression of a portion of the at least one operator. For example, the compression change to one operator can be different from the compression change to another operator. In an exemplary compression change, a first operator can be uncompressed while a second operator is compressed.

In some embodiments, the compression change can include compression or decompression of query expressions of the portion of the at least one operator.

In some embodiments, the query plan can be determined to be stored in the external storage. In this case, the computer system can move the query plan out of the cache. Before the query plan is moved out of the cache, the query plan can be compressed or decompressed to a desired compression level. For example, all of the query operators in the query plan can be compressed. It is appreciated that, a counter of the query plan may be associated with each query plan stored in the external storage counting the number of times the query plan is accessed to generate query results.

In step 607, the computer system can store the processed query plan in the target storage layer.

Figure 7:
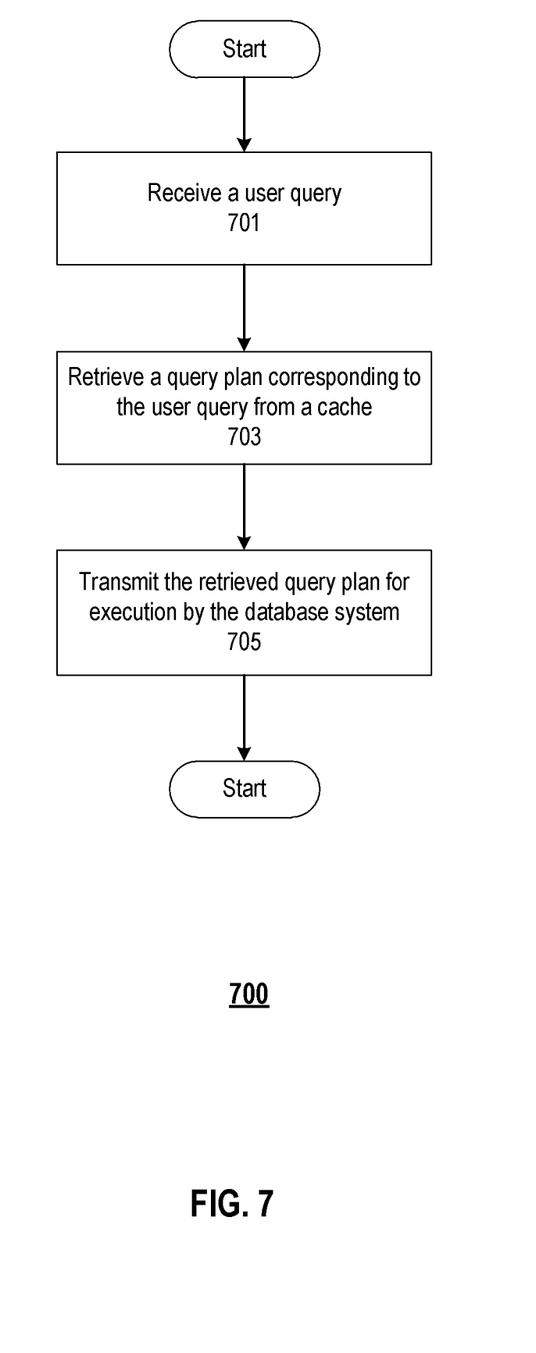
FIG. 7 illustrates a flowchart of an exemplary computer-implemented method of querying a database system, according embodiments of the disclosure

The stored query plans can be then queried, retrieved, and executed. FIG. 7 illustrates a flowchart of a method 700 of querying a database system, according to embodiments of the disclosure. Method 700 may be implemented by a computer system, such as an analytic database system ("ADS") 100 of FIG. 1A. The computer system may include a memory storing a set of instructions and at least one processor configured to execute the set of instructions to cause the computer system to perform method 700. Referring to FIG. 7, method 700 may include steps 701-705 as described below.

In step 701, the computer system can receive a user query. As discussed above, the user query can be an SQL statement.

In step 703, the computer system can retrieve a query plan corresponding to the user query from a cache. The cache can be, for example, query plan cache 305 of FIG. 3 and FIG. 4. The cache can include at least two storage layers (e.g., layers 401, 403, and 405 of FIG. 4) for storing query plans, and each of the storage layers is associated with a compression level (e.g., an uncompressed level, a medium compression level, and a high compression level) of query plans.

The query plan can be retrieved from the cache sequentially or using multiple threads. As discussed above, the query plan can be stored in the cache in association with a reference key. The reference key and the query plan can be generated and stored in the cache together. Therefore, when a user query is received, the computer can generate a key by, for example, parameterizing the received user query, and retrieve the query plan associated with the reference key matching the generated key. In other words, if the reference key is determined to be matching the generated key, it indicates that the query plan associated with the reference key corresponds to the received user query.

In some embodiments, the computer system can sequentially search for the query plan corresponding to the user query in the storage layers. For example, the computer system can sequentially search for the query plan in a first storage layer and a second storage layer. The first storage layer stores a first query plan having a first use frequency, the second storage layer stores a second query plan having a second use frequency, and the first use frequency is greater than the second use frequency. As discussed above, the compression level has a mapping relationship with the user frequency. For example, the first storage layer having a greater use frequency can have a lower compression level. Thus, the computer system can search for the query plan in a less compressed storage layer before searching in a subsequent storage layer.

In some embodiments, the computer system can also search for the query plan corresponding to the user query in the storage layers using multiple threads. Thus, the searching can be performed on more than one storage layers including the first storage layer and the second storage layer.

In step 705, the computer system can transmit the retrieved query plan for execution by the database system.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

Although the specification has been described in conjunction with specific embodiments thereof, it is evident that many alternatives, modifications and variations will be apparent to those skilled in the art. For example, although some embodiments are described using compression of a query plan as an example, the described systems and methods can be applied to decompression of a query plan. Accordingly, it is intended to embrace all such alternatives, modifications and variations that fall within the spirit and broad scope of the appended claims.

What is claimed is:

1. A method for storing a query plan in a cache, comprising:
   determining a use frequency of the query plan, the query plan including at least one query operator;
   determining a target storage layer for storing the query plan based on the determined use frequency, wherein the cache includes at least two storage layers and each of the storage layers is associated with a compression level of query plans;
   processing the query plan according to the compression level of the target storage layer, wherein processing the query plan comprises:
      determining a compression level difference between the compression levels of a first storage layer and the target storage layer,
      determining a compression change to the at least one query operator of the query plan based on the compression level difference, and
      performing the compression change to the at least one query operator of query plan according to a compression algorithm; and
   storing the processed query plan in the target storage layer, wherein the query plan is previously stored in the first storage layer different from the target storage layer and is moved from the first storage layer to the target storage layer.

2. The method of claim 1, wherein the compression level of query plans includes an uncompressed level, a medium compression level, or a high compression level.

3. The method of claim 1, wherein determining the target storage layer for the query plan based on the use frequency further comprises:
   determining compression levels of the at least two storage layers; and
   determining, as the target storage layer, a storage layer having a compression level corresponding to the use frequency.

4. The method of claim 1, wherein the compression change includes compression or decompression of a portion of the at least one query operator.

5. The method of claim 1, wherein each of the at least one query operator further comprises a query expression, and the compression change further comprises compression or decompression of a portion of the query expression.

6. The method of claim 1, wherein the determined target storage layer is an external storage, and processing the query plan according to the compression level of the storage layer further comprises:
   compressing all of query operators included in the query plan.

7. The method of claim 1, wherein the at least two storage layers includes a third storage layer and a second storage layer, the second storage layer is associated with higher compression level than the third storage layer, and query plans stored in the second storage layer are associated with lower use frequencies than query plans stored in the third storage layer.

8. The method of claim 1, wherein a counter is associated with the query plan, the counter counting a number of times the query plan is accessed to generate query results.

9. A computer system for storing a query plan, comprising:
   a cache including at least two storage layers and each of the storage layers is associated with a compression level for query plans;
   a memory storing a set of instructions; and
   at least one processor, configured to execute the set of instructions to cause the computer system to perform:
      determining a use frequency of the query plan, the query plan including at least one query operator;
      determining a target storage layer for storing the query plan based on the determined use frequency, wherein the cache includes at least two storage layers and each of the storage layers is associated with a compression level of query plans;

processing the query plan according to the compression level of the target storage layer, wherein processing the query plan comprises:
- determining a compression level difference between the compression levels of a first storage layer and the target storage layer,
- determining a compression change to the at least one query operator of the query plan based on the compression level difference, and
- performing the compression change to the at least one query operator of query plan according to a compression algorithm; and storing the processed query plan in the target storage layer, wherein the query plan is previously stored in the first storage layer different from the target storage layer and is moved from the first storage layer to the target storage layer.

10. The computer system of claim 9, wherein the at least one processor is configured to execute the set of instructions to cause the computer system to further perform:
- determining compression levels of the at least two storage layers; and
- determining, as the target storage layer, a storage layer having a compression level corresponding to the use frequency.

11. A method of querying a database system, comprising:
- receiving a user query;
- retrieving a query plan corresponding to the user query from a target storage layer of a cache, the query plan including at least one query operator; and
- transmitting the retrieved query plan for execution by the database system, wherein the cache includes at least two storage layers for storing query plans and each of the storage layers is associated with a compression level of query plans, wherein the query plan is previously stored in a first storage layer different from the target storage layer and is moved from the first storage layer to the target storage layer, and wherein the query plan is processed by:
  - determining a compression level difference between compression levels of the first storage layer and the target storage layer;
  - determining a compression change to the at least one query operator of the query plan based on the compression level difference; and
  - performing the compression change to the at least one query operator of query plan according to a compression algorithm.

12. The method of claim 11, wherein retrieving the query plan corresponding to the user query from the cache further comprises:
- retrieving the query plan through the at least two storage layers sequentially; or
- retrieving the query plan through the at least two storage layers using multiple threads.

13. The method of claim 12, wherein retrieving the query plan through the at least two storage layers sequentially further comprises:
- sequentially searching for the query plan corresponding to the user query in a first storage layer and a second storage layer, wherein
- the first storage layer stores a first query plan having a first use frequency and the second storage layer stores a second query plan having a second use frequency, and the first use frequency is greater than the second use frequency.

14. The method of claim 11, wherein the query plan is stored in the cache in association with a reference key.

15. The method of claim 14, wherein retrieving the query plan corresponding to the user query from the cache:
- generating a key by parameterizing the received user query; and
- retrieving the query plan associated with the reference key matching the generated key.

* * * * *